United States Patent
Porozni et al.

(10) Patent No.: US 7,712,128 B2
(45) Date of Patent: May 4, 2010

(54) WIRELESS ACCESS SYSTEM, METHOD, SIGNAL, AND COMPUTER PROGRAM PRODUCT

(75) Inventors: Barry Ian Porozni, Havertown, PA (US); Blair Gaver Nicodemus, North Wales, PA (US); Glenn Alan Schille, Collingswood, NJ (US)

(73) Assignee: Fiberlink Communication Corporation, Blue Bell, PA (US)

( * ) Notice: Subject to any disclaimer, the term of this patent is extended or adjusted under 35 U.S.C. 154(b) by 927 days.

(21) Appl. No.: 10/483,984

(22) PCT Filed: Jul. 24, 2002
(Under 37 CFR 1.47)

(86) PCT No.: PCT/US02/23490
§ 371 (c)(1),
(2), (4) Date: Nov. 30, 2004

(87) PCT Pub. No.: WO03/010669
PCT Pub. Date: Feb. 6, 2003

(65) Prior Publication Data
US 2005/0254651 A1    Nov. 17, 2005

Related U.S. Application Data

(60) Provisional application No. 60/307,172, filed on Jul. 24, 2001, provisional application No. 60/314,656, filed on Aug. 27, 2001.

(51) Int. Cl.
*H04K 1/00*     (2006.01)
(52) U.S. Cl. .......................... 726/5; 380/270; 713/182

(58) Field of Classification Search ............... 713/182, 713/201; 709/203, 219; 455/73, 428; 380/270; 726/5
See application file for complete search history.

(56) References Cited

U.S. PATENT DOCUMENTS

| 5,666,411 A | 9/1997 | McCarty |
| 5,673,322 A | 9/1997 | Pepe et al. |
| 5,732,074 A | 3/1998 | Spaur et al. |
| 5,987,611 A | 11/1999 | Freund |
| 6,012,100 A | 1/2000 | Frailong et al. |

(Continued)

FOREIGN PATENT DOCUMENTS

JP    2001-111544    4/2001

(Continued)

OTHER PUBLICATIONS

Novell eDirectory, Directory Services, Technical White Paper, www.novell.com, total 23 pages.

(Continued)

*Primary Examiner*—Benjamin E Lanier
*Assistant Examiner*—Hadi Armouche
(74) *Attorney, Agent, or Firm*—Pepper Hamilton LLP

(57) ABSTRACT

A system, method, signal, and computer program product for providing secure wireless access to private databases and applications without requiring a separate wireless client-server internetworking security protocol infrastructure. The wireless device (201) communicates with the wireless access service provider (205) via hypertext transfer protocol (HTTP) messages, and the wireless access service provider (205) and the secure network (204) perform a RADIUS authentification for the wireless device (201).

31 Claims, 7 Drawing Sheets

U.S. PATENT DOCUMENTS

| | | | |
|---|---|---|---|
| 6,061,650 | A | 5/2000 | Malkin et al. |
| 6,081,508 | A | 6/2000 | West et al. |
| 6,151,628 | A | 11/2000 | Xu et al. |
| 6,185,609 | B1 | 2/2001 | Rangarajan et al. |
| 6,253,327 | B1 | 6/2001 | Zhang et al. |
| 6,377,982 | B1 | 4/2002 | Rai et al. |
| 6,453,035 | B1 | 9/2002 | Psarras et al. |
| 6,493,349 | B1 | 12/2002 | Casey |
| 6,539,482 | B1 | 3/2003 | Blanco et al. |
| 6,643,782 | B1 | 11/2003 | Jin et al. |
| 6,654,891 | B1 | 11/2003 | Borsato et al. |
| 6,694,437 | B1 | 2/2004 | Pao et al. |
| 6,732,270 | B1 | 5/2004 | Patzer et al. |
| 6,748,543 | B1 | 6/2004 | Vilhuber |
| 6,751,729 | B1 | 6/2004 | Giniger et al. |
| 6,753,887 | B2 * | 6/2004 | Carolan et al. ............. 715/764 |
| 6,760,444 | B1 * | 7/2004 | Leung ........................ 380/270 |
| 6,766,453 | B1 | 7/2004 | Nessett et al. |
| 6,778,498 | B2 | 8/2004 | McDysan |
| 6,785,823 | B1 | 8/2004 | Abrol et al. |
| 6,829,886 | B2 | 12/2004 | Nakata |
| 6,850,943 | B2 | 2/2005 | Teixeira et al. |
| 6,874,139 | B2 | 3/2005 | Krueger et al. |
| 7,039,021 | B1 | 5/2006 | Kokudo |
| 7,249,374 | B1 * | 7/2007 | Lear et al. ...................... 726/6 |
| 2002/0138756 | A1 | 9/2002 | Makofka et al. |
| 2002/0199203 | A1 | 12/2002 | Duffy et al. |
| 2003/0074580 | A1 | 4/2003 | Knouse et al. |
| 2003/0105978 | A1 | 6/2003 | Byrne |
| 2003/0135611 | A1 | 7/2003 | Kemp et al. |
| 2004/0005886 | A1 | 1/2004 | Oda et al. |
| 2004/0088565 | A1 | 5/2004 | Norman et al. |
| 2004/0107360 | A1 | 6/2004 | Herrmann et al. |
| 2004/0123162 | A1 | 6/2004 | Antell et al. |
| 2004/0193907 | A1 | 9/2004 | Patanella |
| 2004/0221174 | A1 | 11/2004 | Le Saint et al. |
| 2005/0015622 | A1 | 1/2005 | Williams et al. |
| 2005/0033596 | A1 | 2/2005 | Tummolo |
| 2005/0044418 | A1 | 2/2005 | Miliefsky |
| 2005/0060537 | A1 | 3/2005 | Stamos et al. |
| 2005/0132225 | A1 | 6/2005 | Gearhart |
| 2005/0138408 | A1 | 6/2005 | Vanover et al. |
| 2005/0144475 | A1 | 6/2005 | Sakaki et al. |
| 2005/0154885 | A1 | 7/2005 | Viscomi et al. |
| 2005/0166065 | A1 | 7/2005 | Eytchison et al. |
| 2005/0172142 | A1 | 8/2005 | Shelest et al. |
| 2005/0188065 | A1 | 8/2005 | O'Rourke et al. |

FOREIGN PATENT DOCUMENTS

| | | |
|---|---|---|
| WO | WO9901969 | 1/1999 |

OTHER PUBLICATIONS

Novell Securelogin Quick Look, http://www.novell.com/products/securelogin/quicklook.html.

Novell Securelogin features and Benefits, http://www.novell.com/products/securelogin/features.html.

Novell eDirectory 8.7 Qucik Look, http://www.novell.com/products/edirectory/quicklook.html.

"Introduction to Radius", Radius—GNU Project—Free Software Foundation (FSF), 5 pages.

"Virtual Private Networking in Windows 2000: An Overview", Microsoft Windows 2000 Server (1999) 28 pages.

"Wi-Fi Security at Work and on the Road", 5 pages.

Davies, Joseph "Radius Protocol Security and Best Practices", Microsoft Windows 2000 Server (Jan. 2002) 16 pages.

Japanese Office Action, dated Dec. 9, 2008.

http://www.redbooks.ibm.com/abstracts/SG245995.html An Introduction to IBM WebSphere Everyplace Suite Version 1.1, Accessing Web and Enterprise Applications. Juan R. Rodriguez.

CN3: "Change request to TS 29.061; Standard method for information delivery (MSISDN; IP address . . . ) between GPRS and external PDN using Radius" 3GPP TSG-CN WG3 (N3-010333), 3RD Generation Partnership Project (3GPP), Jul. 16, 2001, XP050074687 [retrieved on Jul. 16, 2001].

* cited by examiner

WIRELESS ACCESS SYSTEM, METHOD, SIGNAL, AND COMPUTER PROGRAM PRODUCT

CROSS REFERENCE TO RELATED APPLICATIONS

This application claims priority to commonly owned, U.S. provisional patent application Ser. No. 60/307,172, entitled WIRELESS ACCESS SYSTEM, METHOD AND COMPUTER PROGRAM PRODUCT filed in the U.S. patent and Trademark Office on 24 Jul. 2001 and commonly owned, U.S. provisional patent application Ser. No. 60/314,656, entitled WIRELESS ACCESS SYSTEM, METHOD AND COMPUTER PROGRAM PRODUCT filed in the U.S. patent and Trademark Office on 27 Aug. 2001, the entire contents of both being incorporated herein by reference.

BACKGROUND OF THE INVENTION

1. Field of the Invention

The present invention relates to a system, method, signal, and computer program product for providing secure wireless access to private databases and applications. More particularly, the present invention relates to providing secure access to private networks for wireless devices without requiring a separate wireless security/authentication infrastructure for the private network.

2. Discussion of the Background Art

Whenever an external computing device is connected to a corporate network, that network is subject to becoming more vulnerable to security breaches. Network Administrators are left with few tools to guard against break-ins. State of the art security systems generally require special hardware or are only compatible with a small number of products. This problem is exacerbated in large networks that have many points of access.

To address this problem, Lucent Technologies InterNetworking Systems has developed a distributed security solution called Remote Authentication Dial-In User Service, or RADIUS. RADIUS is an example of a client-server internetworking security protocol configured to control authentication, accounting, and access-control in a networked, multi-user environment. RADIUS provides a software protocol based approach to security that does not require special hardware. Distributed security separates user authentication and authorization from the communications process and creates a single, central location for user authentication data. The RADIUS protocols are defined in Internet Engineering Task Force (IETF) Request for Comments (RFC) 2138 dated April 1997 and 2139 dated April 1997, the entire contents of both being incorporated herein by reference. RADIUS is a TCP/IP application layer protocol as defined in TCP/IP Illustrated: The Protocols by W. Richard Stevens (1994) and TCP/IP Clearly Explained, Third Edition, by Pete Loshin (1999), the contents of both being incorporated herein by reference.

Based on a model of distributed security previously defined by the IETF, RADIUS provides an open and scaleable client/server security system. The RADIUS server can be easily adapted to work with third-party security products or proprietary security systems. To date, many types of communications servers or network hardware support the RADIUS client protocols and can communicate with a RADIUS server. RADIUS has become a widely accepted remote authentication protocol.

RADIUS supports a system of distributed security that secures systems against unauthorized access. A system based on RADIUS authentication includes a RADIUS authentication server and a RADIUS client. In conventional RADIUS systems, user authentication and network service access information is located on the RADIUS authentication server. RADIUS supports this information being in a variety of formats based on the customer's requirements. RADIUS, in its generic form, will authenticate users against, for example, a UNIX password file, Network Information Service (NIS), as well as a separately maintained RADIUS database. RADIUS-compliant communications servers operate to connect RADIUS clients with RADIUS servers. The RADIUS client sends RADIUS authentication requests to the RADIUS server and acts on responses sent back by the RADIUS server.

RADIUS is used to authenticate users through a protocol including a series of specially formatted messages between the client and the server. Once a RADIUS user is authenticated, the RADIUS client provides that RADIUS user with access to the appropriate network services.

FIG. 1 is an interaction diagram of an exemplary conventional RADIUS system for providing authentication over the Internet. The order of events in the diagram flows from top to bottom as indicated by the time progression identified by figure element 107. As shown in FIG. 1, an end user 101 initiates a session by dialing 108 into an Internet Service Provider's (ISP) 102 Point of Presence (POP) 103 on the Internet. The ISP POP 103 then requests 109 that the end user 101 identify himself. In response, the end user 101 provides, for example, a user ID, password, and access server identification 110. The ISP POP 103 then sends a RADIUS Access Request Message 111 containing the user identification information to its own ISP authentication server 104, which is a RADIUS server and awaits a response 117. Based on the user identification information provided in the RADIUS Access Request Message 111, the ISP Authentication Server 104 recognizes that the end user 101 is an access service provider 105 user. The access service provider 105 is, in this example, a third party that manages the access of remote end users 101 to a company's internal secure network (e.g., Company XYZ 106). FIBERLINK COMMUNICATIONS CORPORATION is an example of a company that provides this type of service. The ISP Authentication Server 104 therefore sends a RADIUS Access Request Message 113 containing the user identification information to the Access Service Provider 105 and awaits a response 116. Based on the user identification information provided in the RADIUS Access Request Message 113, the Access Service Provider 105 recognizes that the end user 101 is a COMPANY XYZ 106 user. The Access Service Provider 105 therefore sends a RADIUS Access Request Message 114 containing the user identification information to COMPANY XYZ 106 and awaits a response 115. Company XYZ 106 will then perform a RADIUS authentication for this particular end-user 101 and send either a RADIUS Access Granted or RADIUS Access Denied message 115 back to the Access Service Provider 105, which will then forward the RADIUS Access Granted or RADIUS Access Denied message 116 to the ISP authentication server 104, which in turn, forwards the RADIUS Access Granted or RADIUS Access Denied message 117 to the ISP POP 103, which finally generates and transmits a corresponding access granted/access denied status message 118 to the end user 101.

A limitation associated with the above-described capability is that it does not readily accommodate wireless users and their applications. Wireless devices (e.g., Personal Digital Assistants (PDA) and wireless laptops) have become popular productivity tools, and given their portability, have become a desired tool for accessing applications and databases on secure networks from remote locations. Typically, access is via the Internet as accessed through a wireless network provider. Because wireless network providers do not provide the services that an ISP provides, the ability to have RADIUS-authenticated connections from remote wireless devices is limited. Therefore, a tension has been created between providing the convenience of wireless remote access and maintaining a secure network.

One proposed solution to this problem is to provide a parallel authentication capability tailored to the needs of wireless users, wireless data services and communication technologies used in wireless networks. However, maintaining more than one authentication database in an organization is an administrative burden for information security personnel who must update multiple databases when employees or other authorized users arrive, depart, or otherwise change their access posture. Furthermore, maintaining more than one authentication database is an operational annoyance to users who may be required to maintain different passwords and be trained in different information security techniques for wireless and non-wireless access. Even further, as more access paths are provided for a network, more opportunities for a security breach or failure are created.

SUMMARY OF THE INVENTION

The present inventors have recognized that there exists a need to provide secure access for wireless devices without compromising the level of security required by the accessed network. The present inventors have further recognized that since many wireless devices have limited processing power, providing a RADIUS capability on a wireless device is not an acceptable solution. The inventors of the present invention have recognized that by providing an ability to translate non-RADIUS authentication messages from a wireless device into RADIUS authentication messages that the existing RADIUS authentication infrastructure can be used to authenticate wireless devices.

Accordingly, one object of the present invention is to provide systems, devices, communications protocols, and methods for providing RADIUS authentication for wireless devices that do not themselves have a RADIUS capability.

A further object of the present invention is to provide methods and communications protocols for maintaining an integrated wireless/non-wireless security infrastructure.

The above-described and other objects are addressed by the present invention, which includes a novel system, method, signal, and computer program product for authenticating, accounting, and controlling access to a secure network from a wireless device. The wireless device desiring remote access to a secure network sends a request for authentication to a wireless access service provider. The wireless access service provider receives the request and creates a formal authentication request or relays the request for authentication originating from the wireless device in compliance with the authentication system of the secure network and forwards the authentication request to the secure network. Since the ultimate authentication request is a formal request, the secure network handles the wireless user in the same way using the same security infrastructure as it does for non-wireless remote users. The result of the authentication request is sent from the secure network to the wireless access service provider via the formal authentication protocol. The wireless access service provider then translates this result into a wireless device compatible format and finally generates and transmits a corresponding access granted/access denied status message to the wireless device over a wireless transmission link.

In one embodiment of the present invention, the wireless device communicates with the wireless access service provider via hypertext transfer protocol (HTTP) messages, and the wireless access service provider and the secure network perform a RADIUS authentication for the wireless user.

In one embodiment of the present invention, the wireless access service provider is a third party that provides a service of managing remote access to secure networks for wireless devices.

In another embodiment of the present invention, the wireless access service provider is housed within the security environment of an organization that has remote wireless users.

BRIEF DESCRIPTION OF THE FIGURES

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
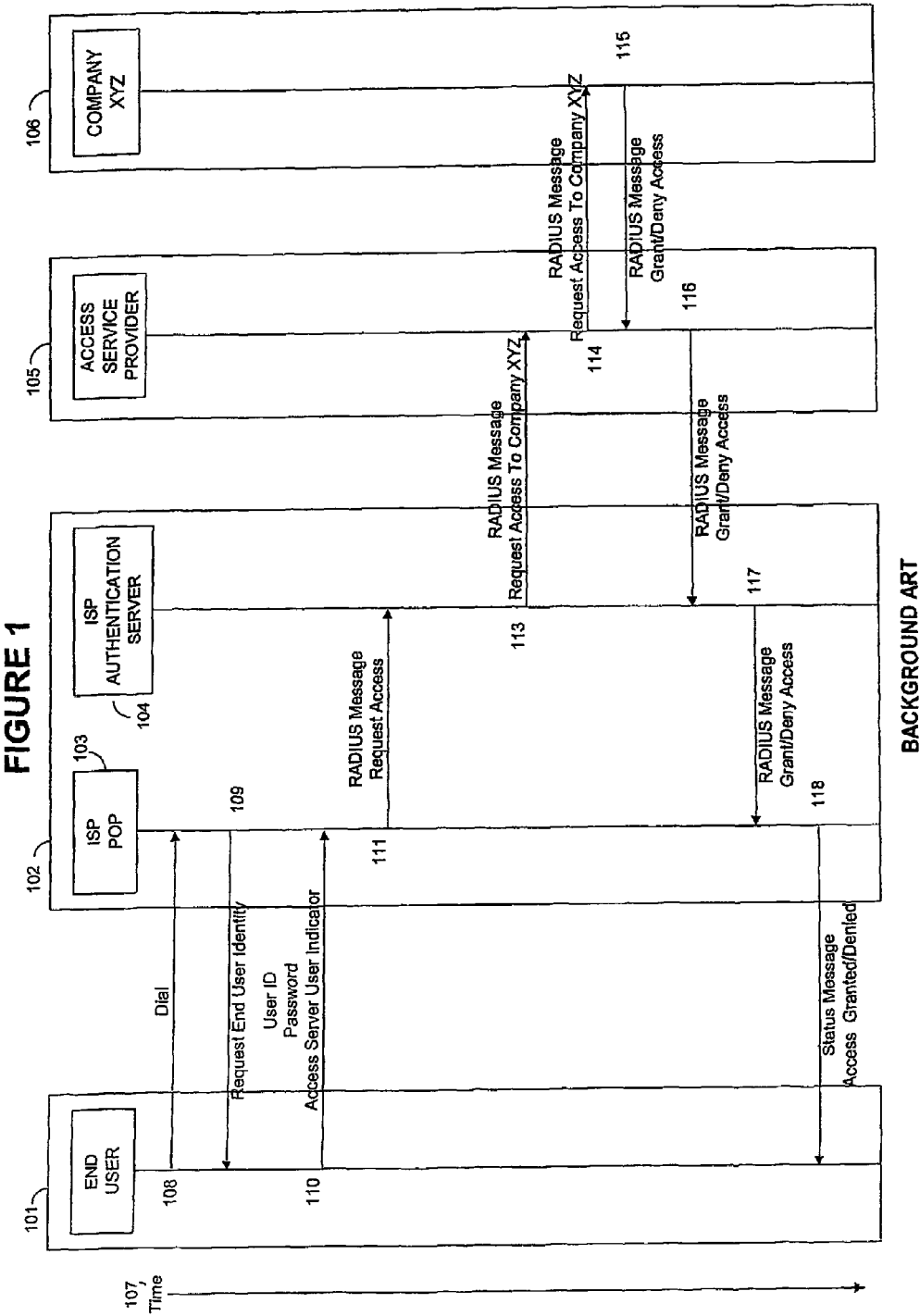
FIG. 1 is an interaction diagram illustrating a conventional authentication process of a remote dial in user.
Figure 2:
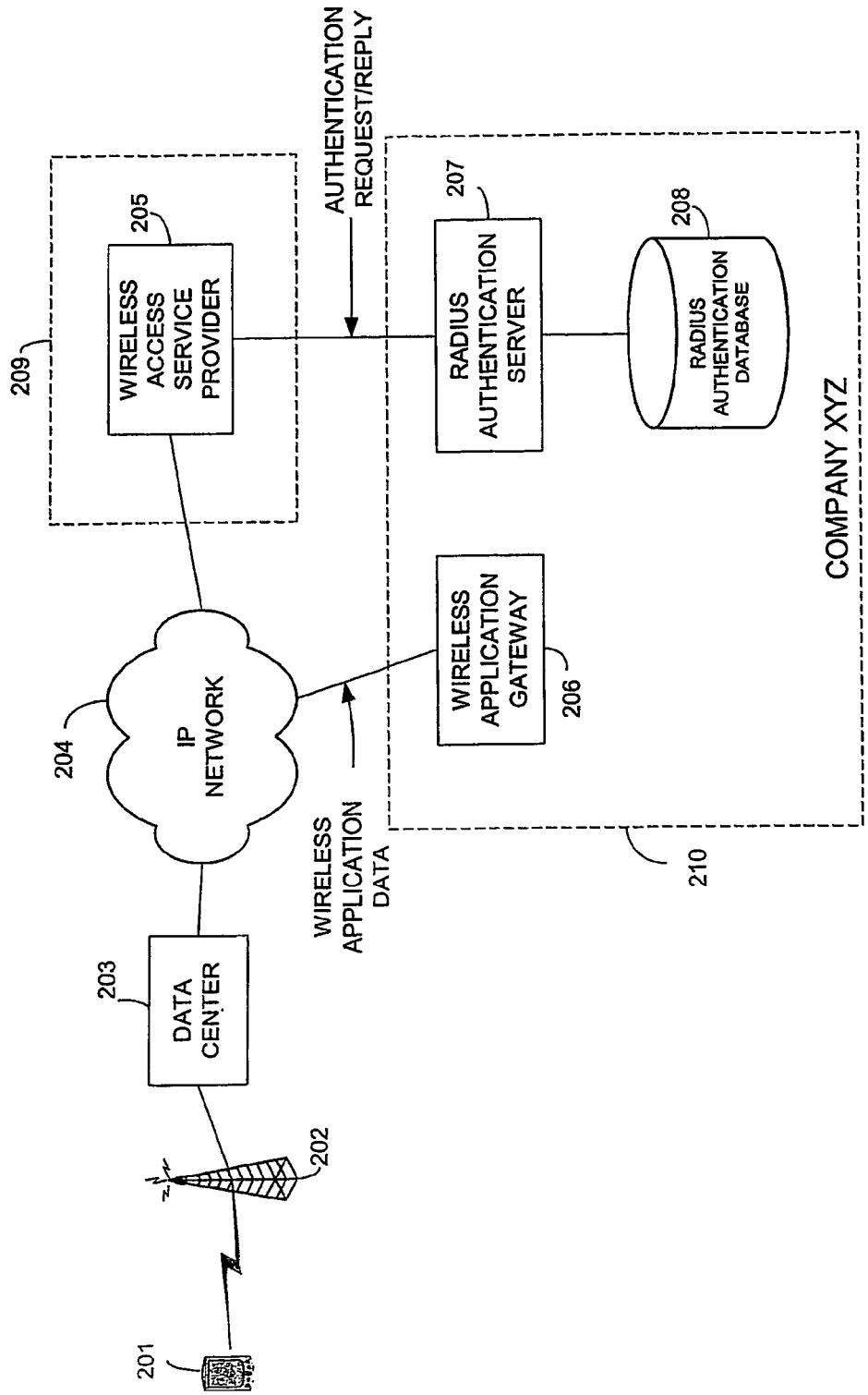
FIG. 2 is a high-level system diagram of one embodiment of the present invention.

Referring now to the figures, FIG. 2 is a high-level system diagram illustrating the various elements that interact with one another according to one embodiment of the present invention. As shown in FIG. 2, the system includes a wireless device 201, such as, for example, a PDA. The wireless device 201 gains access to an IP network 204, for example, the Internet, through a wireless transceiver 202 and a data center 203. As discussed in the Background of the Invention section, wireless users 201 do not gain access to the Internet through an Internet Service Provider (ISP) Point Of Presence (POP), but rather, gain access directly through a data center 203. The data center 203 creates, for example, IP packets, and serves as the intermediary between the IP network 204 and the wireless device 201.

Figure element 209 represents a third party that provides a service of managing remote access to a secure network. For example, figure element 209 may represent FIBERLINK COMMUNICATIONS CORPORATION that provides a service of managing remote access to secure networks of Company XYZ 210. Access to Company XYZ's 210 secure networks is controlled by a RADIUS authentication server 207 that accesses a RADIUS authentication database 208. As discussed in the Background of the Invention section, RADIUS is a widely accepted remote authentication protocol. It should be understood, however, that the present invention is in no way limited to an implementation based on RADIUS. On the contrary, the concepts of the present invention are equally applicable to any authentication protocol.

The RADIUS protocol requires that a RADIUS client communicate with a RADIUS server to perform the authentication process. A RADIUS client, therefore, must be able to not only receive and unpack a RADIUS message, but also create a RADIUS message that can be sent to the RADIUS server. Accordingly, a client application is necessary to perform this requisite processing. As recognized by the present inventors, it is undesirable to place the processing burden of a RADIUS client onto typical wireless devices. As would be understood, a typical wireless device, such as a PDA, has limited processing capability, and it is more desirable to allocate that processing power to user applications, rather than infrastructure applications such as RADIUS.

It was the present inventors who recognized that the processing requirements of a RADIUS client could be offloaded to, for example, a third party 209 providing a service of managing remote access to the secured networks of Company XYZ 210. Accordingly, as shown in FIG. 2, the wireless access service provider 205 serves as the RADIUS client for authenticating access from the wireless user 201. As will be discussed in further detail below, the wireless access service provider 205 serves as a translator to perform a RADIUS authentication with the RADIUS authentication server 207 on behalf of the wireless user 201. In one embodiment of the present invention, the wireless user 201 communicates with the wireless access service provider 205 via the IP network 204 using, for example, hypertext transfer protocol (HTTP) messages, HTTP being commonly supported in wireless devices such as PDAs and laptop computers, which places no additional burden on the wireless user 201. Accordingly, the wireless access service provider 205 translates a request for authentication contained in a HTTP message from the wireless end user 201 into a RADIUS authentication request that is used to initiate the RADIUS authentication with the RADIUS authentication server 207 of Company XYZ 210. This RADIUS authentication request is sent to the RADIUS authentication server 207 of Company XYZ 210 via the IP network 204. In addition, other RADIUS messages, for example, RADIUS account start/stop messages, may be sent from wireless access service provider 205 to the RADIUS authentication server 207 of Company XYZ 210 via the IP network 204. Also, session initiation, session termination, or session time-out messages may be exchanged between the wireless access service provider 205, the wireless user 201, and wireless application gateway 206 via the IP network 204.

The present inventors also recognized that the processing requirements of a RADIUS client could be offloaded to, for example, a separate device dedicated to wireless authentication, located within the confines of Company XYZ, and configured to communicate with the RADIUS authentication server 207 of Company XYZ 210 via the IP network 204. Thus, in an alternative embodiment, the wireless access service provider 205 is located within the boundaries of Company XYZ 210 and is configured to communicate with the RADIUS authentication server 207 the wireless user 201, and the wireless application gateway 206 via an IP network 204. In this alternative embodiment, the wireless access service provider 205 communicates with the RADIUS authentication server 207 and the wireless application gateway 206 via Company XYZ's 210 private IP network, and the wireless access service provider 205 communicates with the wireless user 201 over an external network, for example, the Internet. Those skilled in the art will recognize that in this alternative embodiment, the wireless access service provider 205 and the wireless application gateway 206 could both be implemented as computer programs running on the same computer, in which case an IP network is not needed for the two computer programs to communicate.

Figure 3:
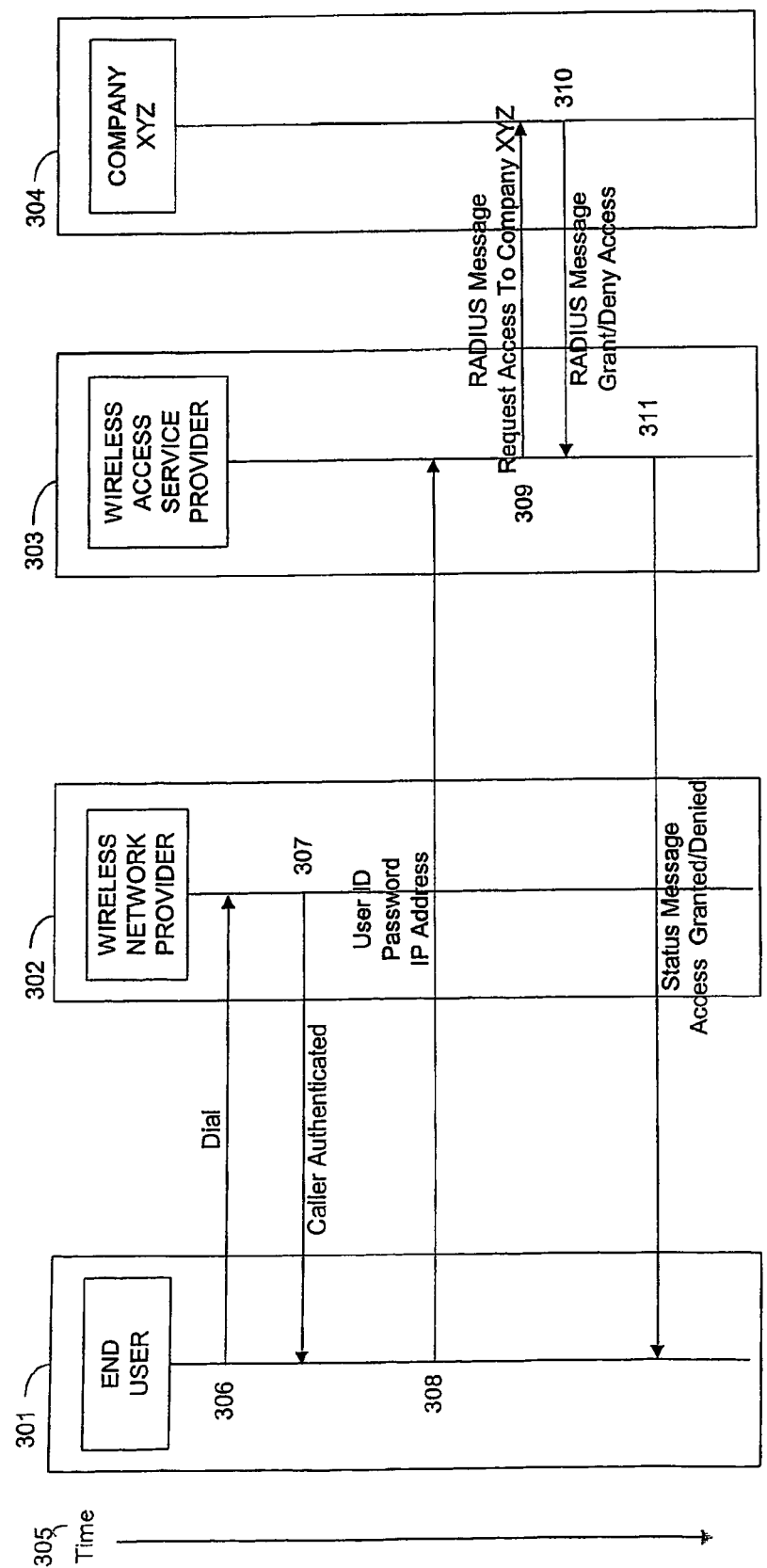
FIG. 3 is an interaction diagram illustrating the authentication of a remote wireless device according to one embodiment of the present invention.

FIG. 3 is an interaction diagram showing the various messages sent in performing a RADIUS authentication of a wireless end user 301. The order of events in the diagram flows from top to bottom as indicated by the time progression identified by figure element 305. As shown in FIG. 3, a wireless end user 301 initiates a session by contacting 306 the wireless network provider 302. The wireless network provider 302 determines if the wireless end user 301 is a valid customer, and if so, sends a message 307 to the wireless end user 301 indicating that the caller has been authenticated as a user of the wireless network provider 302. If the wireless end user 301 desires access to a secure network, the wireless end user 301 sends an authentication request 308 to a wireless access service provider 303. In one embodiment of the present invention, the authentication request message from the wireless end user 301 may include, for example, a user identification, a password, and an IP address of the wireless end user. As was discussed above, in one embodiment of the present invention the wireless access service provider 303 is a third party, that provides a service to Company XYZ 304 of managing remote access to Company XYZ's 304 secure network. In another embodiment of the present invention, the wireless access service provider 303 is part of Company XYZ's 304 internal infrastructure.

Continuing with FIG. 3, upon receipt of the authentication request by the wireless access service provider 303, the wireless access service provider creates a RADIUS message that will be used to initiate a RADIUS authentication session with a RADIUS server of Company XYZ 304. The RADIUS message 309 requesting access to Company XYZ's secure network, includes information that was sent from the end user 301 in the authentication request message 308.

Upon receipt of the RADIUS authentication request message 309, a RADIUS server residing on Company XYZ's 304 secure network will attempt to authenticate the wireless end user 301 by accessing the RADIUS authentication database. Company XYZ's 304 RADIUS authentication server will then send a RADIUS message 310 indicating that access was either granted or denied back to the wireless access service provider 303. The wireless access service provider will interpret the RADIUS message 310 received from Company XYZ 304, and then create a non-RADIUS message 311 to communicate the result of the authentication request back to the wireless end user 301. As discussed above, the communications between the wireless end user 301 and the wireless access service provider are, in one embodiment of the present invention, HTTP messages.

From a perspective of Company XYZ 304, wireless end user 301 is not unlike a typical dial-in user requesting access to Company XYZ's 304 secure networks through an Internet Service Provider. Accordingly, as recognized by the present inventors, wireless end users 301 may be authenticated taking advantage of the same authentication infrastructure that is used by other remote users.

Figure 4:
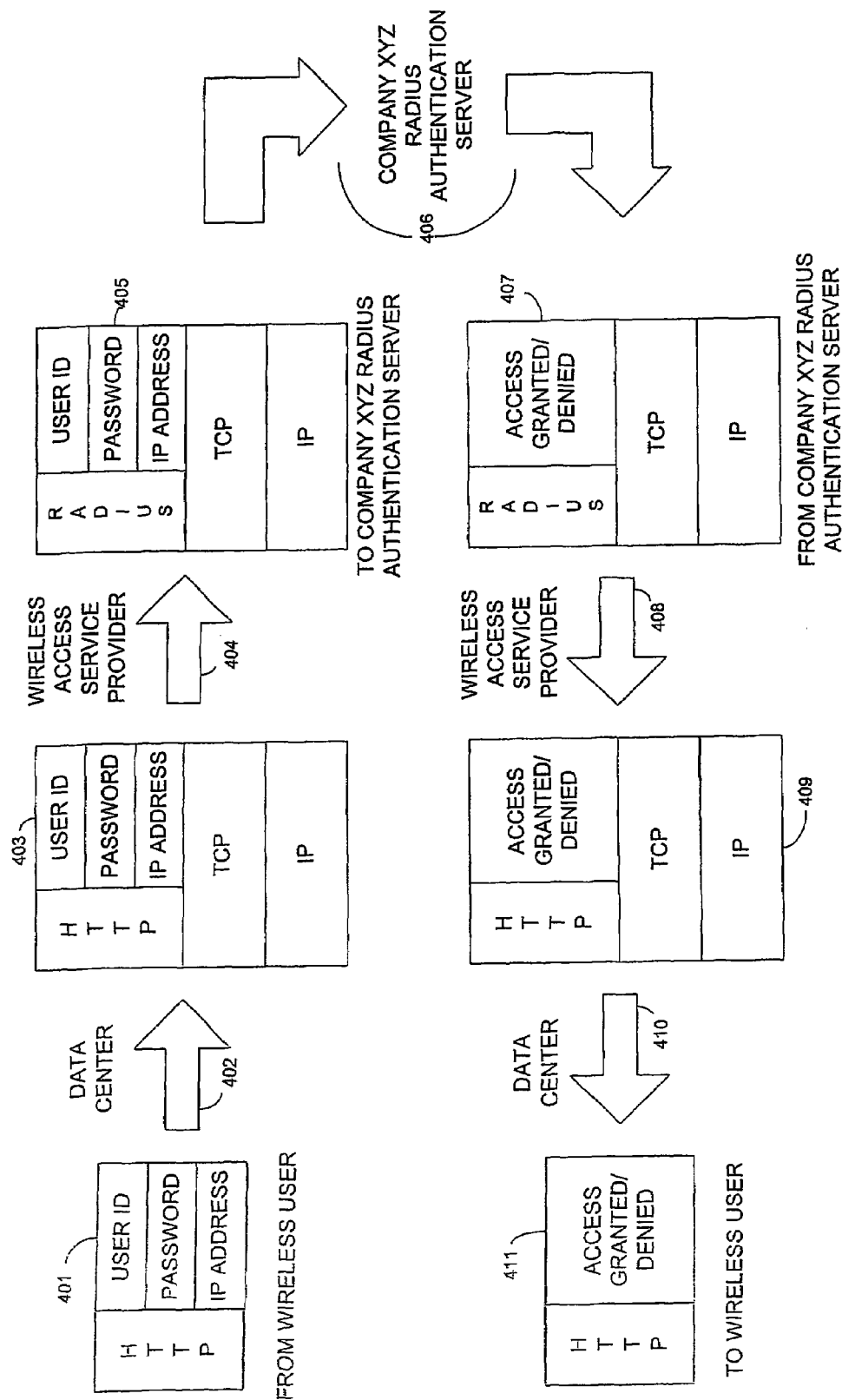
FIG. 4 is a block diagram illustrating message flow according to one embodiment of the present invention.

FIG. 4 is a block diagram illustrating an exemplary message flow in performing a RADIUS authentication of a wireless end user according to one embodiment of the present invention. As shown in FIG. 4, a wireless user sends an HTTP message 401 including a user ID, password, and IP address of the wireless user to a data center 402. The data center 402 creates a TCP/IP packet 403 including the authentication request information and places that TCP/IP packet onto, for example, the Internet. The TCP/IP packet is routed to the wireless access service provider 404. The wireless access service provider 404 recognizes the HTTP message as an authentication request, and reformats the authentication request information into a RADIUS message 405 that includes the user ID, password, and IP address. The RADIUS message 405 is sent as a TCP/IP packet to Company XYZ's RADIUS authentication server 406. Company XYZ's RADIUS authentication server 406 unpacks the RADIUS message 405 and performs a RADIUS authentication against the RADIUS authentication database to determine whether access should be granted or denied for this particular wireless user. Once the determination has been made, Company XYZ's RADIUS authentication server creates a RADIUS message indicating whether access has been granted or denied 407. The RADIUS authentication status message 407 is transmitted as a TCP/IP message to the wireless access service provider 408. The wireless access service provider 408 recognizes that the intended recipient of the RADIUS message is a wireless user, and therefore, reformats the RADIUS message into a HTTP message 409, which is sent as a TCP/IP message back through the data center 410. The data center 410 then transmits an appropriate HTTP message 411 to the wireless user. As can be seen in FIG. 4, the interaction between the outside world and Company XYZ strictly adheres to the RADIUS protocol, and therefore, no special requirements are placed on the authentication infrastructure on Company XYZ to enable support of remote wireless users.

Figure 5:
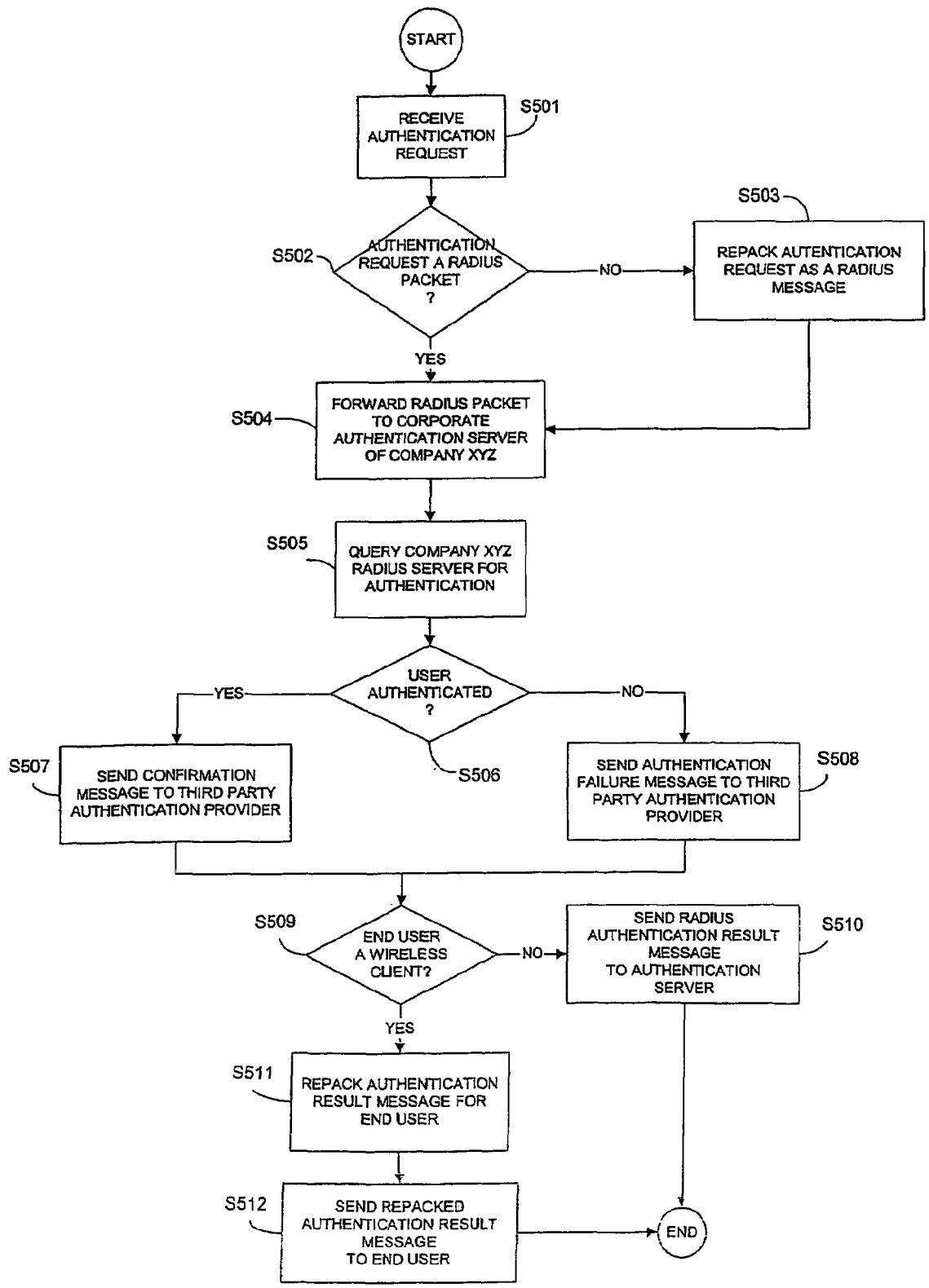
FIG. 5 is a flow chart of an integrated wireless/non-wireless authentication process according to one embodiment of the present invention.

FIG. 5 is a flow chart of an integrated RADIUS/non-RADIUS authentication process according to one embodiment of the present invention. In this example, the wireless access service provider is a third party that provides a service of managing remote access to Company XYZ. As shown in FIG. 5, the process begins with step S501 where an authentication request is received by the wireless access service provider. The process then proceeds to step S502 where it is determined whether the authentication request is a RADIUS packet. If the request is a RADIUS packet (i.e., "yes" at step S502), the process proceeds to step S504 where the RADIUS packet is forwarded to the corporate authentication server of Company XYZ. If, on the other hand, it is determined that the authentication request is not a RADIUS packet (i.e., "no" at step S502), the process proceeds to step S503 where the authentication request is repacked as a RADIUS message. Once the authentication request has been repacked as a RADIUS message, the process proceeds to step S504, described above, where that RADIUS packet is forwarded to the corporate authentication server of Company XYZ.

The process then proceeds to step S505 where the RADIUS authentication server of Company XYZ queries the RADIUS authentication database in an attempt to authenticate the user. The process then proceeds to step S506 where it is determined whether the user is authenticated. If the user is authenticated (i.e., "yes" at step S506), the process proceeds to step S507 where a confirmation message is sent from the RADIUS authentication server of Company XYZ to the third party wireless access service provider. If, on the other hand, the user is not authenticated (i.e., "no" at step S506), the process proceeds to step S508 where the RADIUS authentication server of Company XYZ sends an authentication failure message to the third party wireless access service provider.

After the authentication status message has been sent to the third party wireless access service provider at either step S507 or step S508, the process proceeds to step S509 where the third party wireless access service provider determines whether the end user is a wireless client. If it is determined that the end user requesting authentication is not a wireless client (i.e., "no" at step S509), the process proceeds to step S510 where the RADIUS authentication result message is returned to the RADIUS client that initiated the authentication request. After the authentication result message has been sent to the RADIUS client, the process ends.

If, on the other hand, it is determined that the end user is a wireless client (i.e., "yes" at step S509), the process proceeds to step S511 where the third party wireless access service provider repacks the authentication result message from a RADIUS message into a message compatible with the wireless end user. After the third party wireless access service provider has repacked the authentication result message, the process proceeds to step S512 where the repacked authentication result message is sent to the non-RADIUS end user. After the authentication result has been sent, the process ends.

Figure 6:
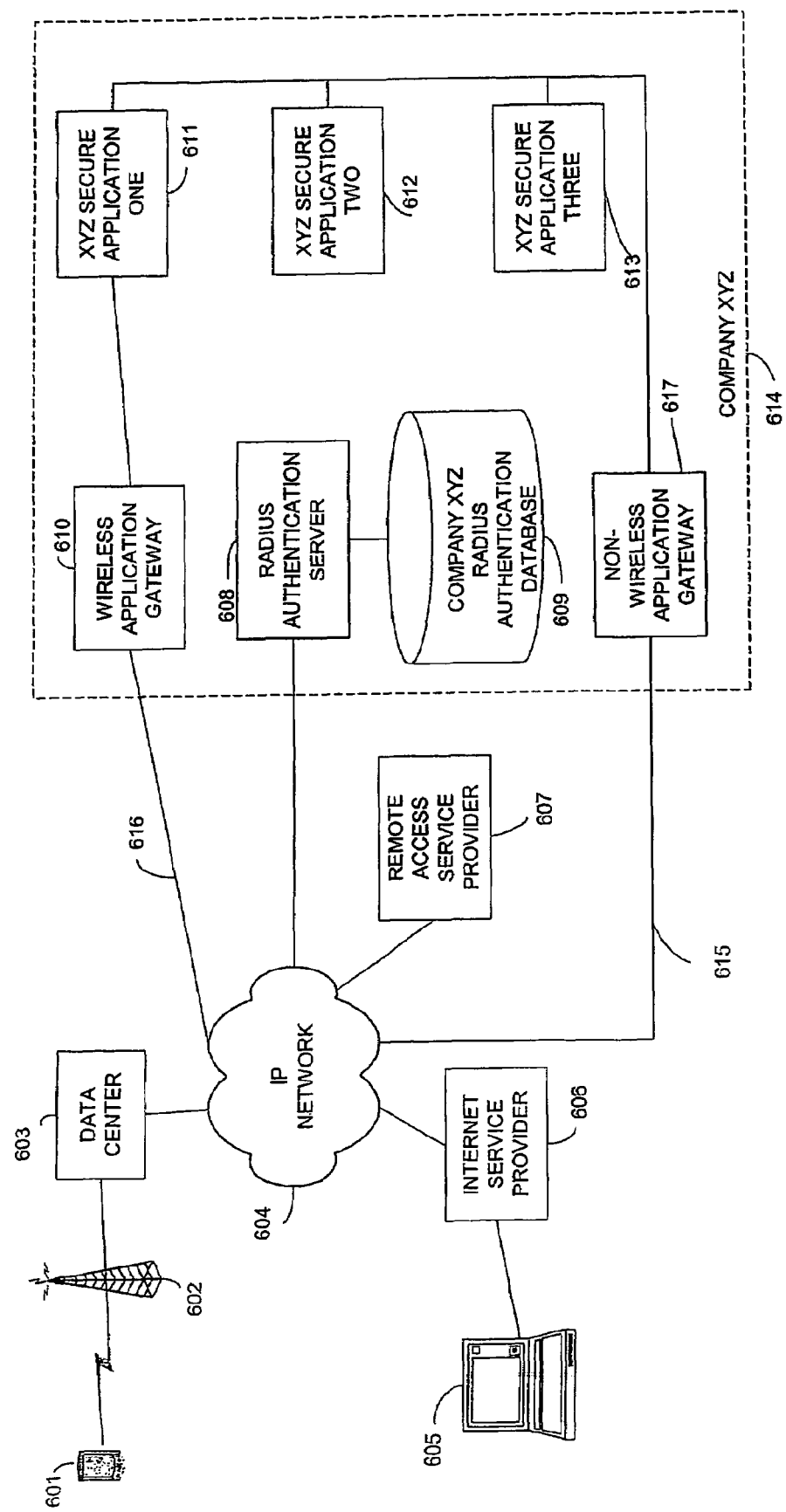
FIG. 6 is a high-level system diagram of one embodiment of the present invention.

FIG. 6 is a high-level system diagram of an integrated RADIUS/non-RADIUS authentication system corresponding to one embodiment of the present invention where the wireless access service provider 607 is located outside of Company XYZ 614. In the integrated RADIUS/non-RADIUS authentication system any remote device (either a wireless device 601 communicating via a wireless network data center 603 and a wireless transceiver 602, or a non wireless device 605 communicating via an ISP 606) is able to communicate with secure applications located inside of Company XYZ 614. Both the wireless network data center 603 and the ISP 606 are configured to relay IP traffic to Company XYZ 614 via an IP network 604.

Based on user information and passwords provided by the remote device, a RADIUS authentication request message is repacked (if the remote device is a wireless device 601) or is relayed (if the remote device is a non-wireless device 605) by the wireless access service provider 607 via the IP network 604 to a RADIUS authentication server 608 located at Company XYZ 614. The RADIUS authentication server 608 checks the information contained in the authentication request message against data contained in the RADIUS authentication database 609 and replies to the wireless access service provider 607 via the IP network 604 with either a RADIUS authentication granted message or a RADIUS authentication denied message. In addition, the wireless access service provider 607 and the RADIUS authentication server 608 exchange RADIUS account management messages via the IP network 604 when a user's account is activated and deactivated.

Optionally, the wireless access service provider 607 may be configured to operate a timer for determining when a wireless session has expired and thereby notifying the remote device (e.g., the wireless device 601 or the non-wireless device 605) and the corresponding gateway device (e.g., the wireless application gateway 610 or the non-wireless application gateway 617). Actual traffic between the remote device (i.e., the wireless device 601 or the non-wireless device 605) and the corresponding gateway device (i.e., the wireless application gateway 610 or the non-wireless application gateway 617) is exchanged via the IP Network 604 over corresponding paths (i.e., wireless data path 616 and non-wireless data path 615). It is also possible to provide different access privileges to different access devices (e.g., when using a wireless device 601 user A may be granted access to secure application one 611, while when using a non-wireless device 605 user A may be granted access to secure application one 611, secure application two 612, and secure application three 613). In another embodiment, the integrated wireless/non-wireless authentication environment may include a wireless access service provider 607 within the boundaries of Company XYZ 614 that communicates with the wireless device 601, the wireless application gateway 610, and the RADIUS authentication server 608 via an IP network 604. In this embodiment, the wireless access service provider 607 communicates with the RADIUS authentication server 608 and the wireless application gateway 610 via Company XYZ's 614 private IP network, and the wireless access service provider 607 communicates with the wireless user 601 over an external network, for example, the Internet. Those skilled in the art will recognize that in this alternative embodiment, the wireless access service provider 607 and the wireless application gateway 610 could both be implemented as computer programs running on the same computer, in which case an IP network is not needed for the two computer programs to communicate.

Figure 7:
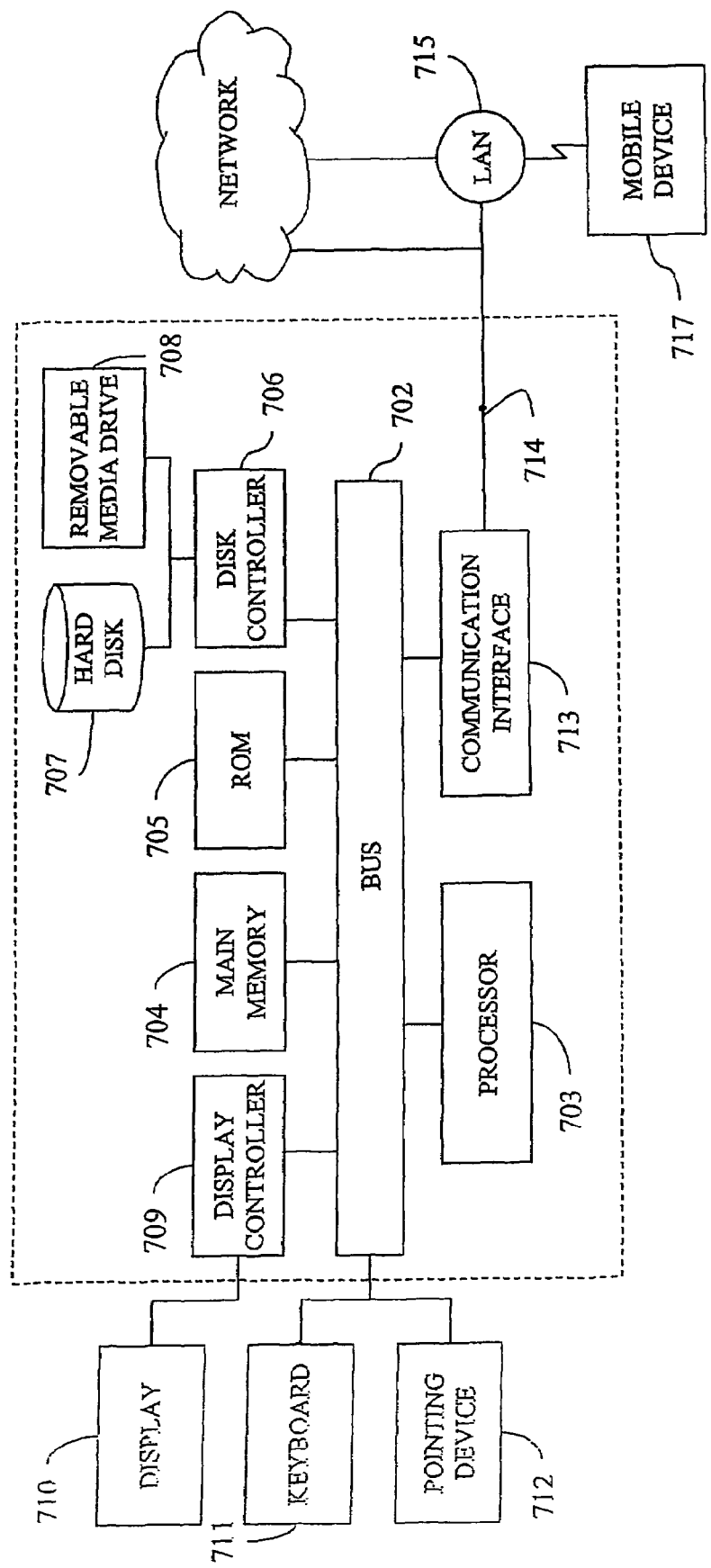
FIG. 7 is a system diagram of an exemplary computer device programmed to control one or more embodiments of the present invention.

FIG. 7 is a block diagram of a computer system 1201 upon which either the first or second embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI) integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user. Such software may include, but is not limited to, device drivers, operating systems, development tools, and applications software. Such computer readable media further include the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire, and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to the Gateway Device 1299. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave.

Instructions, parameters, reference data associated with the above-described embodiments may be encoded in software and/or firmware.

Obviously, numerous modifications and variations of the present invention are possible in light of the above teachings. It is therefore to be understood that within the scope of the appended claims, the invention may be practiced otherwise than as specifically described herein.

What is claimed is:

1. A method for providing a user of a wireless device access to a secure application via a client-server internetworking security protocol configured to at least one of control authentication, perform accounting, and provide access-control in a networked, multiuser environment, comprising steps of:
   receiving an authentication request message requesting access to said secure application from said wireless device at a wireless access service mechanism configured to process said authentication request message, said authentication request message being in accordance with a wireless message protocol and including an IP address of said wireless device and an access credential of the user of said wireless device;
   producing, by the wireless access service mechanism, a client-server internetworking security protocol authentication request message based on said authentication request message by reformatting a portion of said authentication request message in accordance with said client-server internetworking security protocol and including information of said IP address of said wireless device and/or said access credential;
   transmitting said client-server internetworking security protocol authentication request message from said wireless access service mechanism to a client-server internetworking security protocol authentication device configured to perform client-server internetworking security protocol authentication, wherein said client-server internetworking security protocol authentication device authenticates said user for access to said secure application based on said IP address of said wireless device and/or said access credential;
   receiving a client-server internetworking security protocol authentication accept message and/or a client-server internetworking security protocol authentication reject message from said client-server internetworking security protocol authentication device
   processing said client-server internetworking security protocol authentication accept message at said wireless access service mechanism to convert said client-server internetworking security protocol accept message to a wireless authentication accept message according to said wireless message protocol;
   transmitting a client-server internetworking security protocol access message from said wireless access service mechanism to said client-server internetworking security protocol authentication device;
   transmitting a session start message from said wireless access service mechanism to a wireless gateway device;
   transmitting said wireless authentication accept message from said wireless access service mechanism to said wireless device, wherein said user is authorized to access said secure application upon receipt of said wireless authentication accept message;
   timing a connection time between said wireless device and said wireless gateway device so as to produce a wireless timing parameter at said wireless access service mechanism;
   transmitting a session end notification message from said wireless access service mechanism to said wireless device in response to determining that said wireless timing parameter exceeds a predetermined timing value.

2. The method of claim 1, wherein said client-server internetworking security protocol comprises RADIUS.

3. The method of claim 1, further comprising:
   processing said client-server internetworking security protocol authentication request message by said client-server internetworking security protocol authentication device; and
   transmitting said client-server internetworking security protocol authentication accept message and/or said client-server internetworking security protocol authentication reject message from said client-server internetworking security protocol authentication device to said wireless access service mechanism via a direct connection and/or a local network.

4. The method of claim 1, further comprising:
   transmitting a client-server internetworking security protocol access authentication Accounting-End Message from said wireless access service mechanism to said client-server internetworking security protocol authentication device via a direct connection and/or a local network.

5. The method of claim 1, further comprising:

transmitting a client-server internetworking security protocol access authentication Accounting-End Message from said wireless access service mechanism to said client-server internetworking security protocol authentication device via a direct connection and/or a local network.

6. The method of claim 1, further comprising:

processing said client-server internetworking security protocol authentication reject message at said wireless access service mechanism to convert said client-server internetworking security protocol reject message to a wireless authentication reject message according to said wireless message protocol; and transmitting said wireless authentication rejection message from said wireless access service mechanism to said wireless device.

7. The method of claim 2, wherein said step of transmitting said client-server internetworking security protocol authentication request message includes transmitting via a global network.

8. The method of claim 7, further comprising:

transmitting said session start message from said wireless access service mechanism to a wireless gateway device via said global network.

9. The method of claim 8, further comprising:

transmitting said session end notification from said wireless access service mechanism to said wireless gateway device and/or said wireless device via said global network if said wireless timing parameter exceeds said predetermined timing value.

10. The method of claim 8, further comprising:

transmitting said client-server internetworking security protocol access authentication Accounting-End Message from said wireless access service mechanism to said client-server internetworking security protocol authentication device via said global network.

11. The method of claim 9, further comprising:

transmitting said client-server internetworking security protocol access authentication Accounting-End Message from said wireless access service mechanism to said client-server internetworking security protocol authentication device via said global network.

12. The method of claim 7, further comprising:

processing said client-server internetworking security protocol authentication reject message at said wireless access service mechanism to convert said client-server internetworking security protocol reject message to a wireless authentication reject message according to said wireless message protocol; and transmitting said wireless authentication reject message from said wireless access service mechanism to said wireless device.

13. A system configured to interface a wireless device to a secure application via a client-server internetworking security protocol configured to control authentication, perform accounting, and/or provide access-control in a networked, multiuser environment comprising:

said wireless device connected to a wireless service provider via a wireless connection medium;

a wireless access service mechanism connected to said wireless service provider via a global telecommunications network, said wireless access service mechanism being configured to:

receive an authentication request message from a user of said wireless device requesting access to said secure application, said authentication request message being in accordance with a wireless message protocol and including an IP address of said wireless device and an access credential of a user of said wireless device;

convert said authentication request message to a client-server internetworking security protocol authentication request message by reformatting a portion of said authentication request message in accordance with an internetworking security protocol and including information of at least one of said IP address of said wireless device and said access credential;

transmit said client-server internetworking security protocol authentication request message from said wireless access service mechanism to a client-server internetworking security protocol authentication device configured to perform client-server internetworking security protocol authentication, wherein said client-server internetworking security protocol authentication device authenticates said user for access to said secure application based on said IP address of said wireless device and/or said access credential;

receive a client-server internetworking security protocol authentication accept message and/or a client-server internetworking security protocol authentication reject message from said client-server internetworking security protocol authentication device process said client-server internetworking security protocol authentication accept message at said wireless access service mechanism to convert said client-server internetworking security protocol accept message to a wireless authentication accept message according to said wireless message protocol;

transmit a client-server internetworking security protocol access message from said wireless access service mechanism to said client-server internetworking security protocol authentication device;

transmit a session start message from said wireless access service mechanism to a wireless gateway device;

transmit said wireless authentication accept message from said wireless access service mechanism to said wireless device, wherein said user is authorized to access said secure application upon receipt of said wireless authentication accept message;

time a connection time between said wireless device and said wireless gateway device so as to produce a wireless timing parameter at said wireless access service mechanism;

transmit a session end notification message from said wireless access service mechanism to said wireless device in response to determining that said wireless timing parameter exceeds a predetermined timing value; and a client-server internetworking security protocol authentication device connected to said wireless access service mechanism, wherein said client-server internetworking security protocol authentication device authenticates said user for access to said secure application based on said IP address of said wireless device and/or said access credential.

14. The system of claim 13, wherein said client-server internetworking security protocol comprises RADIUS.

15. The system of claim 14, further comprising:
said wireless gateway device connected to said wireless access service mechanism; and
said secure application connected to said wireless gateway device.

16. The system of claim 14, wherein said wireless access service mechanism and said client-server internetworking security protocol authentication device are connected by a direct connection and/or a local network.

17. The system of claim 14, wherein said wireless access service mechanism and said client-server internetworking security protocol authentication device are connected by a global network.

18. The system of claim 15, wherein said wireless access service mechanism and said wireless gateway device are connected by a direct connection and/or a local network.

19. The system of claim 15, wherein said wireless access service mechanism and said wireless gateway device are connected by a global network.

20. An apparatus configured to interface at least one wireless client application to at least one secure application via a client-server internetworking security protocol configured control authentication, perform accounting, and/or provide access-control in a networked, multi-user environment, comprising:
a wireless access service mechanism configured to:
receive an authentication request message from said at least one wireless client application requesting access to said at least one secure application, said authentication request message being in accordance with a wireless message protocol and including an IP address of said wireless device and an access credential of a user of said wireless device,
convert said authentication request message to a client-server internetworking security protocol authentication request message by reformatting a portion of said authentication request message from said wireless message protocol to a client-server internetworking protocol;
forward said client-server internetworking security protocol authentication request message to a client-server internetworking security protocol authentication device for authentication of said at least one wireless client application for access to said at least one secure application, said client-server internetworking security protocol authentication request message being in accordance with a client-server internetworking security protocol and including information of said IP address of said wireless device and/or said access credential;
receive a client-server internetworking security protocol authentication accept message and/or a client-server internetworking security protocol authentication reject message from said client-server internetworking security protocol authentication device
process said client-server internetworking security protocol authentication accept message at said wireless access service mechanism to convert said client-server internetworking security protocol accept message to a wireless authentication accept message according to said wireless message protocol;
transmit a client-server internetworking security protocol access message from said wireless access service mechanism to said client-server internetworking security protocol authentication device;
transmit a session start message from said wireless access service mechanism to a wireless gateway device;
transmit said wireless authentication accept message from said wireless access service mechanism to said wireless device, wherein said user is authorized to access said secure application upon receipt of said wireless authentication accept message;
time a connection time between said wireless device and said wireless gateway device so as to produce a wireless timing parameter at said wireless access service mechanism; and
transmit a session end notification message from said wireless access service mechanism to said wireless device in response to determining that said wireless timing parameter exceeds a predetermined timing value.

21. The apparatus of claim 20, wherein said client-server internetworking security protocol comprises RADIUS.

22. A computer program product including a computer storage medium, said computer storage medium comprising volatile media and/or non-volatile media, and a computer program code mechanism embedded in the computer storage medium, for providing a user of a wireless device access to a secure application via a client-server internetworking security protocol configured to control authentication, perform accounting, and/or provide access-control in a networked, multi-user environment, the computer code mechanism comprising:
at least one of unit of software and a unit of firmware configured to:
convert a wireless authentication message requesting access to said secure application to a client-server internetworking security protocol authentication request message by reformatting a portion of said wireless authentication message and to exchange said client-server internetworking security protocol authentication request message with a client-server internetworking security protocol device, said wireless authentication message being in accordance with a wireless message protocol and including an IP address of said wireless device and an access credential of a user of said wireless device, and said client-server internetworking security protocol message being in accordance with a client-server internetworking security protocol and including information of said IP address of said wireless device and/or said access credential;
receive a client-server internetworking security protocol authentication accept message and/or a client-server internetworking security protocol authentication reject message from said client-server internetworking security protocol authentication device
process said client-server internetworking security protocol authentication accept message at said wireless access service mechanism to convert said client-server internetworking security protocol accept message to a wireless authentication accept message according to said wireless message protocol;
transmit a client-server internetworking security protocol access message from said wireless access service mechanism to said client-server internetworking security protocol authentication device;
transmit a session start message from said wireless access service mechanism to a wireless gateway device;

transmit said wireless authentication accept message from said wireless access service mechanism to said wireless device, wherein said user is authorized to access said secure application upon receipt of said wireless authentication accept message;

time a connection time between said wireless device and said wireless gateway device so as to produce a wireless timing parameter at said wireless access service mechanism;

transmit a session end notification message from said wireless access service mechanism to said wireless device in response to determining that said wireless timing parameter exceeds a predetermined timing value; and transmit a session end notification message from a wireless access service mechanism to said wireless device in response to determining that a wireless timing parameter exceeds a predetermined timing value;

wherein said user is authenticated for access to said secure application based on said IP address of said wireless device and/or said access credential.

23. The computer program product of claim 22, wherein said client-server internetworking security protocol comprises RADIUS.

24. The method of claim 1, wherein said access credential includes a user identification and/or a password associated with a user of the wireless device.

25. The system of claim 13, wherein said access credential includes a user identification and/or a password associated with a user of the wireless device.

26. The apparatus of claim 20, wherein said access credential includes a user identification and/or a password associated with a user of the wireless device.

27. The computer program product of claim 22, wherein said access credential includes a user identification and/or a password associated with a user of the wireless device.

28. The method of claim 1, wherein said wireless message protocol comprises HTTP and said client-server internetworking security protocol comprises RADIUS.

29. The system of claim 13, wherein said wireless message protocol comprises HTTP and said client-server internetworking security protocol comprises RADIUS.

30. The apparatus of claim 20, wherein said wireless message protocol comprises HTTP and said client-server internetworking security protocol comprises RADIUS.

31. The computer program product of claim 22, wherein said wireless message protocol comprises HTTP and said client-server internetworking security protocol comprises RADIUS.

* * * * *